(12) United States Patent  
Tsukamoto

(10) Patent No.: US 7,973,792 B2  
(45) Date of Patent: *Jul. 5, 2011

(54) IMAGE FORMING DEVICE AND ELECTRONIC MEDIUM AND IMAGE PROCESSING PROGRAM FOR IMAGE FORMING DEVICE

(75) Inventor: Yasushi Tsukamoto, Osaka (JP)

(73) Assignee: Kyocera Mita Corporation, Osaka-shi (JP)

( * ) Notice: Subject to any disclaimer, the term of this patent is extended or adjusted under 35 U.S.C. 154(b) by 395 days.

This patent is subject to a terminal disclaimer.

(21) Appl. No.: 11/724,560

(22) Filed: Mar. 15, 2007

(65) Prior Publication Data

US 2007/0229514 A1 Oct. 4, 2007

(30) Foreign Application Priority Data

Mar. 29, 2006 (JP) ................................. 2006-090076

(51) Int. Cl.
*G06T 11/00* (2006.01)
*G06K 15/02* (2006.01)
(52) U.S. Cl. ........ 345/467; 358/1.11; 715/256; 715/264
(58) Field of Classification Search .................. 345/171, 345/467; 715/256, 264; 358/1.11
See application file for complete search history.

(56) References Cited

U.S. PATENT DOCUMENTS

| 5,233,683 | A  | * | 8/1993 | Sasaki .......................... 358/1.11 |
| 5,946,105 | A  | * | 8/1999 | Oishi et al. ..................... 358/434 |
| 6,111,654 | A  | * | 8/2000 | Cartier et al. ................. 358/1.16 |
| 6,522,330 | B2 | * | 2/2003 | Kobayashi ..................... 345/467 |
| 2003/0038958 | A1 | * | 2/2003 | Salgado et al. ............... 358/1.11 |
| 2003/0128383 | A1 | * | 7/2003 | Teranoshita .................. 358/1.15 |
| 2005/0165808 | A1 | * | 7/2005 | Ohtani et al. ................. 707/100 |
| 2006/0055960 | A1 | * | 3/2006 | Hirano et al. ................. 358/1.15 |
| 2006/0077450 | A1 | * | 4/2006 | Reddy et al. ................. 358/1.15 |
| 2006/0221360 | A1 | * | 10/2006 | Yoshida ......................... 358/1.1 |

* cited by examiner

*Primary Examiner* — Michelle K Lay

(57) ABSTRACT

A method for an image forming device, an electronic medium, and an image processing program, which enables external output of image data and font data for the image data with ease. The image forming device includes an input unit, a font data memory unit, a font data read-and-write control unit, a font control unit, and an output unit. The input unit inputs image data. The font data memory unit stores font data by associating it with a character code. The font data read-and-write control unit controls read-and-write operation on the font data of the font data memory unit. The font control unit acquires the font data to be used for the image data and controls conversion of the acquired font data according to an image forming mode. The output unit controls external output of the image data from the image control unit and the converted font data to be used to for the image data.

9 Claims, 3 Drawing Sheets

IMAGE FORMING DEVICE AND ELECTRONIC MEDIUM AND IMAGE PROCESSING PROGRAM FOR IMAGE FORMING DEVICE

FIELD OF THE INVENTION

The present invention relates to an image forming and an electronic medium and an image processing program used for the image forming device, and more particularly to an image forming device that is installed to optimally function on a Multifunction Peripheral or Multi-Functional Peripheral (hereinafter "MFP") having multiple functions such as of a printer, a copier, and a facsimile, and an electronic medium and an image processing program used for the image forming device.

BACKGROUND OF THE INVENTION

In recent years, provided for MFPs are devices that are functional in multiple languages other than Japanese, such as English, Korean, and Chinese. For instance, the following configuration is known. They are capable of storing one or two main language font(s) and switch-displaying among multiple languages.

However, problems with the conventional MFPs are that addition of font data is limited to a standard language. Unless the MFPs are installed with a language font other than that of the standard one, image data containing the language font neither can be displayed nor printed.

The present invention was made in order to address such issues by providing an image forming device which enables easy creation of image data containing font data of which characters and symbol codes have been added or altered and enables save of the image data and the font data to be used for the image data, as well as providing an electronic medium and an image forming program used for the image forming device.

SUMMARY OF THE INVENTION

The present invention provides a method for an image forming device, and an electronic medium and an image processing program for the image forming device to enable external output of image data and font data to be used the image data with ease.

FIG. 1 shows a configuration of a conventional MFP. It creates print image data from input printer data with font data acquired from a print font data memory unit 3 at a printer control unit 1 and outputs the data to an image control unit 5, or outputs image data read from a scanner processing unit 7 to the image control unit 5. Based on an instruction from a display panel 11 through a panel control unit 9, the MFP prints out such print image data or read image data by controlling output of the data at the image control unit 5 to a printer processing unit 13. Alternatively, the MFP, based on an instruction from a display panel 11 through a panel control unit 9, adds a name and/or an ID of a transmitter and/or a recipient created with transmission font data from a transmission font data memory unit 17 at a transmission image control unit 19 to the header and/or the footer of the data and transmits the data through facsimile to an external network (not shown) by controlling output of the data at the image control unit 5 to a transmission control unit 15. Additionally, the MFP displays various display data from the image control unit 5 on the display panel 11, through the panel control unit 9.

A display font data memory unit 21 stores display font data to be displayed on the display panel 11, whose read-and-write operation is controlled by the panel control unit 9. A reception processing unit 23 outputs, for example, a facsimile signal received from a network to the image control unit 5.

For making this type of MFP functional in multiple languages, unless a desired language font data is stored in each of the print font data unit 3, the transmission font data unit 17, and the display font data memory unit 21, image data cannot be created, a character cannot be added to image data, and display font data cannot be displayed on the display panel 11. However, storing of multiple language font data in advance is considerably costly, and required languages differ from the user to the user.

Accordingly, a conventional MFP stores one or two main language font(s) in addition to the language used in the country a device thereof is installed in the display font data memory unit 21 as standard language(s) (for example, Japanese and alphanumeric characters), and is configured to enable switch-display among multiple languages mainly from the display panel 11 to minimize inconvenience in panel operation.

This type of methods for supporting multiple languages are disclosed in Japanese Patent Laid-Open No. 07-115490 and No. 09-107453.

However, a problem with the aforementioned MFPs is that although adding optional language font data to the display font memory unit 21 enables display of an additional language to the display unit 11, even if an instruction is given through the display unit 11, print image data cannot be created, or additional font data cannot be added to transmission image data because the font data does not exist in the print font data memory unit 3 and the transmission font data memory unit 17. Thus, addition of font data is limited to a standard language.

Furthermore, when language font data is added or altered, although the display panel 11 can display the data, image data with such additional font data results in problems. For example, when an address book is saved to an external medium, unless a MFP having input the image data from the external medium has been installed with a language font other than a standard one, the image data can neither be displayed nor printed.

In recent years, due to increasing use of the aforementioned MFP in many countries, a solution for the aforementioned issues to support multiple languages has been long awaited.

An image forming device of the present invention for solving the aforementioned issues has an input unit, a font data memory unit, a font data read-and-write control unit, a font control unit, and an output unit. The input unit inputs image data to be formed. The font data memory unit stores font data corresponding to a character code in a read-and-write manner by associating the font data with the character code. The font data read-and-write control unit controls reading and writing of the font data of the font data memory unit. The font control unit acquires the font data corresponding to the character code to be used for the image data through the font data read-and-write control unit and controls conversions of the acquired font data, depending on an image forming mode. The output unit controls external output of the image data and the converted data to be used for the image data.

Furthermore, configuration of an external memory output port as the output unit is a preferred embodiment of the present invention.

Alternatively, the font data read-and-write control unit can be configured to manage and control storing of multiple types of language font data.

In a preferred embodiment of the present invention, the electronic medium stores the image data and the converted font data to be used for the image data.

An image forming program of the present invention is for causing a computer, with respect to an image forming control device that controls conversion of font data, depending on an image forming mode, to perform input processing, read-and-write processing, font conversion processing, and output processing. The input processing is to input image data to be formed. The read-and-write processing is to control reading and writing of font data of a font data memory unit, wherein the font data corresponds to a character code, by associating the font data with the character code. The font conversion processing is to acquire from the font data memory unit the font data corresponding to the character code to be used for image data and to control conversion of the acquired font data, depending on an image processing mode. The output processing is to control external output of the image data and the converted font data used for the image data.

An image forming device and an image forming program of the present invention are configured to input image data, store font data corresponding to a character code, control reading and writing of the font data, acquire the font data and control conversion of the acquired font data, and control external output of the image data and the converted font data. More specifically, they input image data at an input unit, store font data corresponding to a character code in a font data memory unit in a read-and-write manner by associating the font data with the character code, and control reading and writing of the font data of the font data memory unit at a font data read-and-write control unit. They also acquire the font data corresponding to the character code to be used for the image data, at a font control unit through the font data read-and-write control unit, and control conversion of the acquired font data, depending on an image forming mode. They further control external output of the image data and the converted font data to be used for the image data at an output unit.

This configuration enables easy creation of image data containing font data of which characters and symbol codes have been added or altered, and enables save of the image data and the converted font data to be used for the image data.

Furthermore, in a configuration having an external memory output port as the output unit, output data can be easily stored and saved to a universal memory medium, such as a USB (Universal Serial Bus) memory.

Yet furthermore, in a configuration wherein the font data read-and-write control unit manages and controls storing of a plurality of language font data, image data containing a font of the added or altered language font data can be saved together with the font data to be used for the image data.

Yet furthermore, an electronic medium having stored the image data and the converted font data to be used for the image data allows even a MFP and other types of data devices installed with standard font data only to display and print image data.

These and other objects, features, and advantages of the present invention are specifically set forth in or will become apparent from the following detailed descriptions of the invention when read in conjunction with the accompanying drawings.

DETAILED DESCRIPTION OF THE INVENTION

Exemplary embodiments of the present invention are explained below with reference to the accompanying drawings though these embodiments are not intended to limit the invention. Additionally, in some instances, well-known structures, interfaces, and processes have not been shown in detail in order not to unnecessarily obscure the present invention.

The following describes the preferred embodiments of the present invention with reference to drawings.

Figure 1:
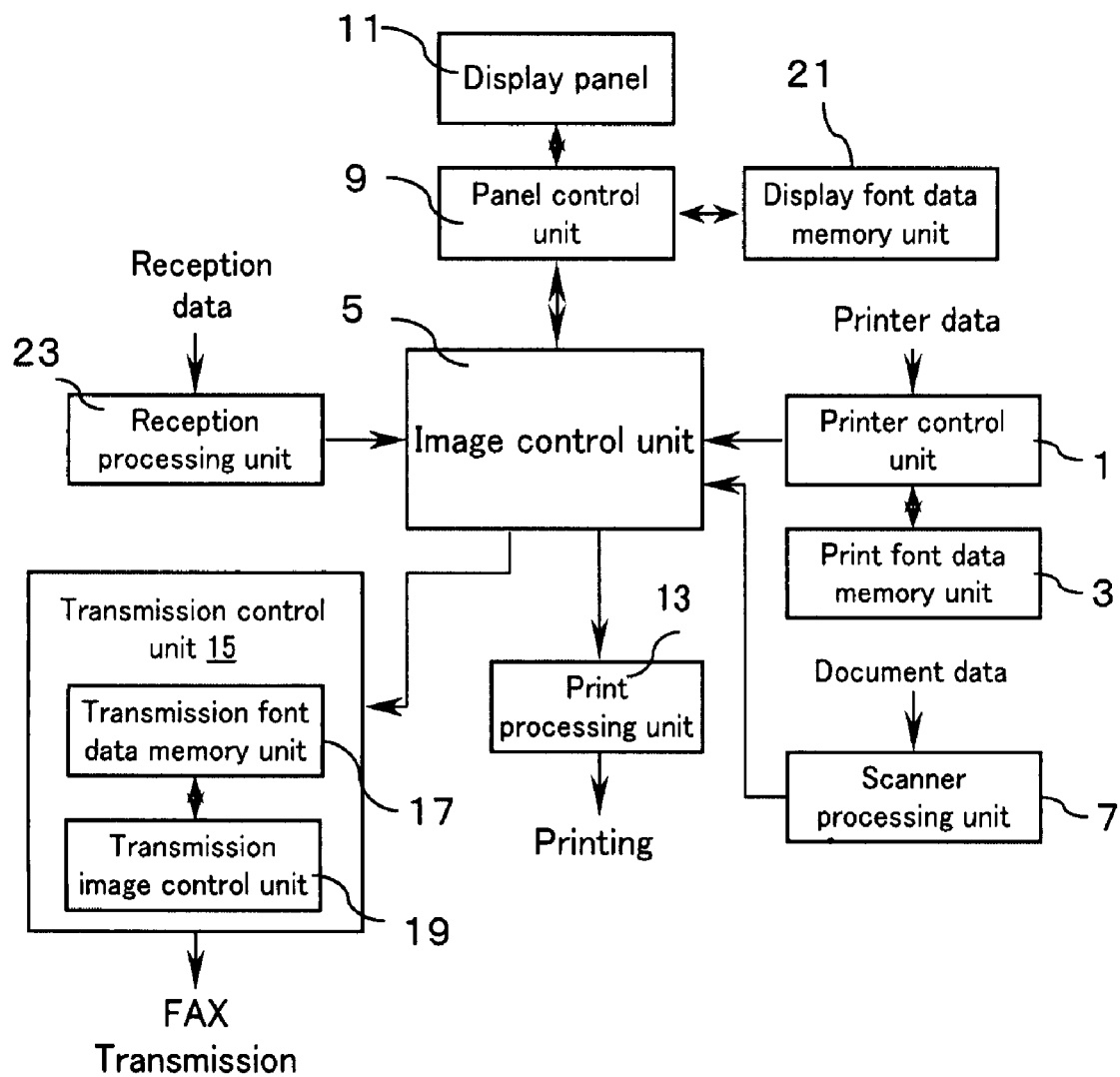
FIG. 1 is a block diagram illustrating an example of a conventional image forming device.
Figure 2:
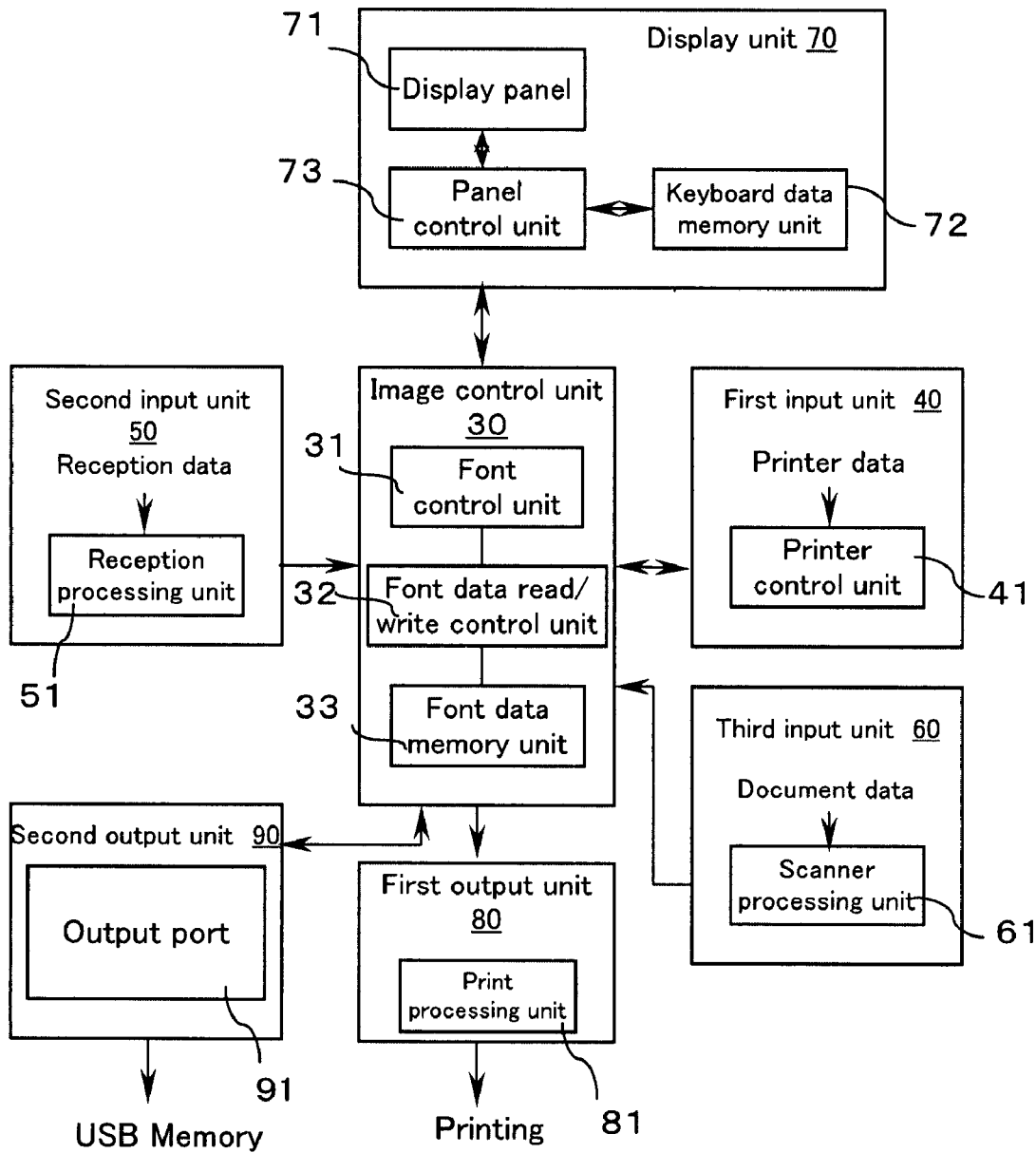
FIG. 2 is a block diagram illustrating a preferred embodiment of an image forming device of the present invention.

FIG. 2 is a block diagram presenting a preferred embodiment of an image forming device of the present invention.

FIG. 2 shows an image forming device of the present invention having an image control unit 30 schematically as the hub, a first input unit 40, a second input unit 50, a third input unit 60, a display unit 70, a first output unit 80, and a second output unit 90.

The image control unit 30 includes a font control unit 31, a font data read-and-write control unit 32, and a font data memory unit 33. The detailed functions are described hereinafter.

The first input unit 40 includes a printer unit control unit 41 and inputs printer (image) data from a computer (not shown) to the printer control unit 41, creates print image data at the printer control unit 41 with font data acquired through the font control unit 31, which is described hereinafter, and outputs the print image data to the image control unit 30.

The second input unit 50 has a reception control unit 51 and deciphers data received through a network (not shown), for instance, facsimile reception number, to convert into image data, outputs the converted data to the image control unit 30, and inputs additional language data and others.

Language data includes identification data which presents a country code, character string data which is constituted of a character code to be displayed arranged in a table format, font (character) data associated with the character code and others for displaying on a display panel 71 and for printing and transmission, software keyboard layout data corresponding to a language. This specification simply describes a character code, font data, and keyboard data among other language data.

The third input unit 60 has a scanner processing unit 61, and as units of other conventional devices, reads document data, coverts the data into digital image data, and outputs it to the image control unit 30.

The display unit 70 includes a conventional type of display panel 71, a keyboard data memory unit 72, and a panel control unit 73. The display panel 71 has panel display function and touch input function. The keyboard data memory unit 72 stores multiple keyboard layout data by language, which is to be displayed on the display panel 71, and font data to be displayed on key locations of the keyboard layout data. The panel control unit 73 creates a display keyboard image, based on an instruction from the display panel 71, by incorporating the keyboard layout data and the font data, and controls display of the display keyboard image on the display panel 71. Keyboard layout data and others of a standard language have been stored in advance into the keyboard data memory unit 72.

The panel control unit 73 can also output information on an instruction input by touch by the operator at the display panel 71 to the image control unit 30.

The first output unit 80 is a conventional printer engine and the like which outputs print image data output from the image control unit 30 by printing it out on a paper.

The second output unit 90 has an output port 91 which stores, based on an instruction input at the display panel 71, along with image data (document data) from the image control unit 30, font data from the font control unit 31 to be used for the image data, into an external medium, such as a USB memory.

The image control unit 30 stores language font data in a read-and-write manner, controls reading of the data, and creates display data for displaying the operation status and contents of various selection instructions to be output to the panel control unit 73 at the font control unit 31, the font data read-and-write control unit 32, and the font data memory unit 33. Additionally, the image control unit 30, based on an instruction input at the display panel 71, outputs image data from the printer control unit 41, the scanner processing unit 61, or the reception processing unit 51 to a printer processing unit 81 as print image data, or to transmission control unit 91 as image data to be externally stored. The image control unit 30 can further perform functions described hereinafter.

Figure 3:
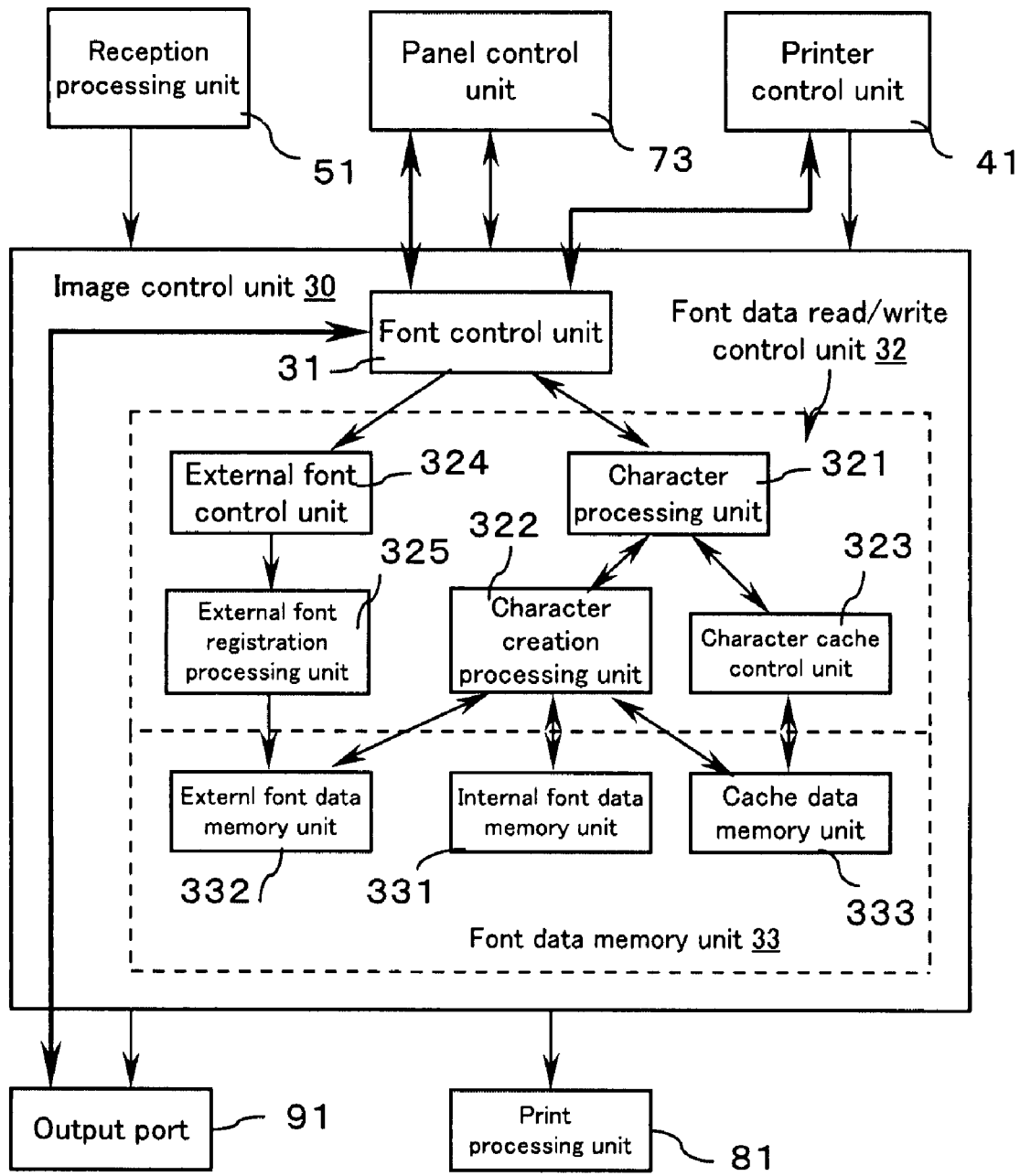
FIG. 3 is a block diagram illustrating a configuration example of an image control unit of FIG. 1 of the present invention.

The font data read-and-write control unit 32 and the font data memory unit 33 are configured as shown in FIG. 3.

The font data read-and-write control unit 32 includes a character processing unit 321 connected to the font control unit 31, a character creating processing unit 322 and a character cache control unit 323 which are connected to the character processing unit 321. The font data read-and-write control unit 32 further includes an external font unit 324 connected to the font control unit 31 and an external unit font registration processing unit 325 connected to the external font unit 324, and controls read-and-write operations upon font data of the font data memory unit 33.

The font data memory unit 33 includes an internal font data memory unit 331, an external font data memory unit 332, and a cache data memory unit 333, which are connected to the character creation processing unit 322. Furthermore, the external font data memory unit 332 is connected to the external font registration processing unit 325, and the cache data memory unit 333 is connected to character cache control unit 323. These memory units constituting the font data memory units store font data corresponding to characters and symbol codes in a read-and-write manner by associating the font data with the characters and the symbol codes.

The internal font data memory unit 331 stores Japanese and other languages as standard language font data in advance. The font data read-and-write control unit 32 manages and controls storing of multiple types of language font data into the external font data memory unit 332 for each language.

Accordingly, for adding language font data, based on an instruction input at the display panel 71, the font control unit 31 stores an additional language code and the corresponding additional font data into the external font data memory unit 332, through the external font control unit 324 and the external font registration unit 325.

Additionally, for acquiring internal font data corresponding to a character code, based on an instruction from the display panel 71 through the panel control unit 73 and the font control unit 31, the character processing unit 321 reads font data corresponding to the character code from the internal font data memory unit 331 through the character creation processing unit 322, and outputs the font data to the font control unit 31. Meanwhile, the character processing unit 321 stores the font data that has been already read out into the font cache data memory unit 333 through the character cache control unit 323. Based on an instruction of rereading the font data by the font control unit 31, the character processing unit 321 also reads out the font data corresponding to the character code from the font cache data memory unit 333 through the character cache control unit 323, and outputs the font data to the font cache control unit 31.

For acquiring font data corresponding to an additional character code, font data corresponding to the character code is read from the external font data memory unit 332 through the character creation processing unit 322 and the character processing unit 321, or from the cache data memory unit 333 through the character cache control unit 323 and the character processing unit 321.

For storing keyboard layout data corresponding to additional language data and font data to be displayed on key locations of the keyboard layout data, based on an instruction through the display panel 71, the font control unit 31 controls of storing the data into the keyboard data memory unit 72 through the panel control unit 73.

The font control unit 31 controls output of the acquired data to the panel control unit 73 by converting the data format, depending on a display mode for displaying the data on the display panel 71. Alternatively, the font control unit 31 controls output of the acquired data to the printer control unit 41 by converting the data format, depending on an image forming mode of print image data. The font control unit 31 also controls output of controlling output of the acquired data to the transmission image control unit 91 by converting the data format, depending on an additional mode for the header and the footer on transmission image data.

In other words, the font control unit 31 has a function of controlling conversion of the acquired font data, depending on a display mode and other modes used for image data such as print image data and output image data.

The following briefly describes operation of the aforementioned image forming device of the present invention.

For registering an additional language font, for instance, once an external medium having stored additional language data is connected to the reception processing unit 51 of the second input unit 50, the font control unit 31, based on an instruction through the display panel 71, controls storing of external font data into the external font data memory unit 332 through the external font control unit 324 and the external font registration processing unit 325 by associating the external font data with a character code.

For displaying an additional keyboard on the display panel 71, based on a language selection instruction input at the display panel 71, requested keyboard layout data and font data are read from the keyboard data memory unit 72, and incorporated to be displayed on the display panel 71 through the panel control unit 73.

Alternatively, for displaying additional font data on the display panel 71, the font control unit 31 acquires font data corresponding to a character code from the external font data memory unit 332 through the character creation processing unit 322 and the character processing unit 321 or from the cache data memory unit 333 through the character cache control unit 323 and the character processing unit 321.

Next, the following describes operation of forming image data from printer data with additional font data to externally output the data.

The font control unit 31, based on an instruction (character code) from the printer control unit 41, acquires font data corresponding to the character code from the external font data memory unit 332 through the character processing unit 321 and the character creation processing unit 322 or from the cache data memory unit 333 through the character cache control unit 323 and the character processing unit 321, converts a format of the font data, depending on the formation mode of print image data, to output it to the printer control unit 41.

The printer control unit 41 forms print image data with additional font data from printer data and outputs the print image data to the image control unit 30. The image control unit 30 then outputs the image data and the font data to be used for the image data to the output port 91 for them to be stored into a USB and other external media.

The image forming device of the present invention configured in this manner includes the input unit 40, the input unit 50, the input unit 60, the font data memory unit 33, the font data read-and-write control unit 3, the font control unit 31, and the second output unit 90. More specifically, the input unit 40, the input unit 50, and the input unit 60 input image data. The font data memory unit 33 stores font data corresponding to a character in a read-and-write manner by associating the font data with the character. The font data read-and-write control unit 32 controls the font data of the font data memory unit 33 in a read-and-write manner. The font control unit 31 acquires, through the font data read-and-write control unit 32, the font data corresponding to the character to be used for the image data and controls conversions of the acquired font data, depending on the image forming mode. The second output unit 90 controls external output of the image data and the converted font data to be used for the image data.

Accordingly, character font data can be easily added or altered, and moreover, even if character font data is added or altered, output image data can be easily created with the added or altered font data. Furthermore, image data of document data or an address book and character font data to be used for the image data can be output and saved into an external memory and the like.

Therefore, even a MFP without font data required for image data can display and/or print out the image data, and provide other advantages for the user.

Furthermore, because the font data read-and-write control unit 32 manages and controls storing of multiple types of language font data by each language, various language font data can be easily added or altered, and more conveniently, print image data and other types of output image can be easily created with the altered language font data. These features can help promote the use of the invention in numerous countries.

Yet furthermore, the second output unit 90 is constituted of the external memory output port 91 such as a USB, so that output data can be easily stored into such universal media.

An electronic medium of the present invention stores image data and converted font data to be used for the image data. The electronic media is not restricted to a USB, but also can be MO (Magneto-Optical disk), HDD (Hard Disk Drive), and other conventional external media to realize the present invention.

Embodiments of the present invention can be applied not only to character font data, but also to other font data such as of characters and symbol codes.

The image forming processing program of the present invention is for causing a computer, with respect to a an image forming control device including the font control unit 31, the font data read-and-write control unit 32, the font data memory unit 33, and the second output unit 90 as main units, to perform the method steps of input processing, read-and-write processing, font conversion processing, and output processing. The input processing is to input image data to be formed. The read-and-write processing is to control read-and-write operation upon font data of the font data memory unit 33, wherein the font data corresponds to a character code such as a character and a symbol code, by associating the font data with the character code. The font conversion processing is to acquire the font data corresponding to the character code to be used for the image data from the font data memory unit 33 and control conversions of the acquired font data, depending on an image forming mode. The output processing is to control external output of the image data and the converted font data to be used for the image data.

The present document incorporates by reference the contents of Japanese priority document, Japanese Patent Application No. 2006-090076, filed in Japan on Mar. 29, 2006.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step (s) of" in the claims herein is not intended to invoke the provisions of 35 U.S.C. 112, Paragraph 6.

What is claimed is

1. An image forming device comprising:
   an input unit which inputs an image data to be formed;
   a font data memory unit which stores in a read-and-write manner font data corresponding to a character code, wherein the stored font data comprises its association with the character code;
   a font data read-and-write control unit which controls read-and-write operation upon the font data of the font data memory unit, and which manages and controls storing of a plurality of language font data;
   a font control unit which acquires the font data corresponding to the character code to be used for the image data through the font data read-and-write control unit, and which controls conversion of the acquired font data depending on a display mode and an image formation mode comprising panel display, image print, facsimile transmission, and header and footer on facsimile transmission,
   which conversion enables addition of external font data to be converted and used for a plurality of display modes and image formation modes, which conversion avoids requiring of maintaining separate font data sets for each of the plurality of display modes and image formation modes comprising panel display, image print, and converting image data into transmittal signal, which transmittal signal comprises transmitting the converted transmittal signal via facsimile to an external network, and an additional mode for a header and a footer in the image data, wherein the header and the footer are produced from character codes and a body of the transmittal signal via facsimile comprises bitmap data; and
   an output unit which controls external output of the image data and the converted font data to be used to for the image data, wherein the output unit comprises an external memory output port.

2. The image forming device of claim 1, wherein the output unit comprises a USB memory output port;
   the image data and the converted font data to be used to for the image data are stored in a USB memory; and the font control unit acquires the image data and the converted font data to be used to for the image data from the USB memory if the USB is connected to the output unit.

3. The image forming device of claim 1, wherein the output unit stores the image data and the converted font data to be used in the image data in an external medium, which converted font data has been converted depending on a display mode and an image formation mode comprising panel display, image print, facsimile transmission, and header and footer on facsimile transmission;

the external medium is then connected to an MFP without font data required for the image data; and the font control unit of the MFP without font data required for the image data acquires the image data and the converted font data to be used in the image data from the external media to display and/or print out the image data;

and wherein the font control unit can process both external fonts and internal fonts, by the font control unit processing external font through an external font control unit, which is connected to an external font registration processing unit within the font data read-and-write control unit, and through external font data memory unit within the font data memory unit;

and by the font control unit processing internal font through a character processing unit connected to a character creation processing unit and a character cache control unit within the font data read-and-write control unit, and the character creation processing unit is connected to an internal font data memory unit and a cache data memory unit within the font data memory unit, and the character cache control unit is connected to the cache data memory unit.

4. A computer program product in a non-transitory computer-readable storage medium for controlling an image forming device, comprising machine-readable code for causing a machine to perform the method steps of:

an input unit inputs an image data to be formed;

a font data memory unit stores in a read-and-write manner font data corresponding to a character code, wherein the stored font data comprises its association with the character code;

a font data read-and-write control unit controls read-and-write operation upon the font data of the font data memory unit, and manages and controls storing of a plurality of language font data;

a font control unit acquires the font data corresponding to the character code to be used for the image data through the font data read-and-write control unit, and controls conversion of the acquired font data depending on a display mode and an image formation mode comprising panel display, image print, facsimile transmission, and header and footer on facsimile transmission;

which conversion enables addition of external font data to be converted and used for a plurality of display modes and image formation modes, which conversion avoids requiring of maintaining separate font data sets for each of the plurality of display modes and image formation modes comprising panel display, image print, and converting image data into transmittal signal, which transmittal signal comprises transmitting the converted transmittal signal via facsimile to an external network, and an additional mode for a header and a footer in the image data, wherein the header and the footer are produced from character codes and a body of the transmittal signal via facsimile comprises bitmap data; and an output unit controls external output of the image data and the converted font data to be used to for the image data, wherein the output unit comprises an external memory output port.

5. The computer program product of claim 4, wherein the output unit comprises a USB memory output port;

the image data and the converted font data to be used to for the image data are stored in a USB memory; and the font control unit acquires the image data and the converted font data to be used to for the image data from the USB memory if the USB is connected to the output unit.

6. The computer program product of claim 4, wherein the output unit stores the image data and the converted font data to be used in the image data in an external medium, which converted font data has been converted depending on a display mode and an image formation mode comprising panel display, image print, facsimile transmission, and header and footer on facsimile transmission;

the external medium is then connected to an MFP without font data required for the image data; and the font control unit of the MFP without font data required for the image data acquires the image data and the converted font data to be used in the image data from the external media to display and/or print out the image data;

and wherein the font control unit can process both external fonts and internal fonts, by the font control unit processing external font through an external font control unit, which is connected to an external font registration processing unit within the font data read-and-write control unit, and through external font data memory unit within the font data memory unit;

and by the font control unit processing internal font through a character processing unit connected to a character creation processing unit and a character cache control unit within the font data read-and-write control unit, and the character creation processing unit is connected to an internal font data memory unit and a cache data memory unit within the font data memory unit, and the character cache control unit is connected to the cache data memory unit.

7. A method for controlling an image forming device and for controlling conversion of font data, comprising the method steps of:

an input unit inputs an image data to be formed;

a font data memory unit stores in a read-and-write manner font data corresponding to a character code, wherein the stored font data comprises its association with the character code;

a font data read-and-write control unit controls read-and-write operation upon the font data of the font data memory unit, and manages and controls storing of a plurality of language font data;

a font control unit acquires the font data corresponding to the character code to be used for the image data through the font data read-and-write control unit, and controls conversion of the acquired font data depending on a display mode and an image formation mode comprising panel display, image print, facsimile transmission, and header and footer on facsimile transmission;

which conversion enables addition of external font data to be converted and used for a plurality of display modes and image formation modes, which conversion avoids requiring of maintaining separate font data sets for each of the plurality of display modes and image formation modes comprising panel display, image print, and converting image data into transmittal signal, which transmittal signal comprises transmitting the converted transmittal signal via facsimile to an external network, and an additional mode for a header and a footer in the image data, wherein the header and the footer are produced from character codes and a body of the transmittal signal via facsimile comprises bitmap data; and an output unit controls external output of the image data and the converted font data to be used to for the image data, wherein the output unit comprises an external memory output port.

8. The method of claim 7, wherein the output unit comprises a USB memory output port;

the image data and the converted font data to be used to for the image data are stored in a USB memory; and the font control unit acquires the image data and the converted font data to be used to for the image data from the USB memory if the USB is connected to the output unit.

9. The method of claim 7, wherein the output unit stores the image data and the converted font data to be used in the image data in an external medium, which converted font data has been converted depending on a display mode and an image formation mode comprising panel display, image print, facsimile transmission, and header and footer on facsimile transmission;

the external medium is then connected to an MFP without font data required for the image data; and the font control unit of the MFP without font data required for the image data acquires the image data and the converted font data to be used in the image data from the external media to display and/or print out the image data;

and wherein the font control unit can process both external fonts and internal fonts, by the font control unit processing external font through an external font control unit, which is connected to an external font registration processing unit within the font data read-and-write control unit, and through external font data memory unit within the font data memory unit;

and by the font control unit processing internal font through a character processing unit connected to a character creation processing unit and a character cache control unit within the font data read-and-write control unit, and the character creation processing unit is connected to an internal font data memory unit and a cache data memory unit within the font data memory unit, and the character cache control unit is connected to the cache data memory unit.

* * * * *